United States Patent [19]
Rizzi et al.

[11] Patent Number: 5,280,951
[45] Date of Patent: Jan. 25, 1994

[54] APPARATUS FOR USE IN INFLATING AN AIR BAG AND METHOD OF ASSEMBLY

[75] Inventors: Douglas L. Rizzi, East Detroit; James R. Hocking, Sterling Heights; William F. McLeod, Roseville; Craig M. Fischer, Rochester Hills; Pondget P. Wipasuramonton, Rochester, all of Mich.

[73] Assignee: TRW Vehicle Safety Systems Inc., Lyndhurst, Ohio

[21] Appl. No.: 839,586

[22] Filed: Feb. 24, 1992

[51] Int. Cl.⁵ .............................. B60R 21/26
[52] U.S. Cl. ..................... 280/736; 280/741
[58] Field of Search .............. 280/736, 737, 741; 222/3; 220/581

[56] References Cited

U.S. PATENT DOCUMENTS

| | | |
|---|---|---|
| 2,496,877 | 2/1950 | Krueger . |
| 4,109,578 | 8/1978 | Goetz .............................. 280/741 X |
| 4,538,395 | 9/1985 | Edmonds et al. . |
| 5,016,914 | 5/1991 | Faigle et al. . |
| 5,022,674 | 6/1991 | Frantom et al. .................... 280/741 |
| 5,078,422 | 1/1992 | Hamilton et al. ............... 280/741 X |

Primary Examiner—Joseph D. Pape
Attorney, Agent, or Firm—Tarolli, Sundheim & Covell

[57] ABSTRACT

An apparatus for inflating an air bag includes a container (12) which holds a supply of gas under pressure. The container (12) is filled with gas through an internally threaded opening (48). Once the container (12) has been filled with gas, an externally threaded plug (50) is threaded into the internally threaded opening (48) in the container. A seal ring (60) extends around the plug (50) and provides a first seal between the container and the plug. A weld (64), which extends around a peripheral portion of the plug (50) and extends between the plug and the container, provides a second seal between the container and plug.

14 Claims, 4 Drawing Sheets

APPARATUS FOR USE IN INFLATING AN AIR BAG AND METHOD OF ASSEMBLY

BACKGROUND OF THE INVENTION

The present invention relates to an apparatus for use in inflating a vehicle occupant restraint, such as an air bag, and to a method by which the apparatus is assembled.

A known apparatus for use in inflating a vehicle occupant restraint, such as an air bag, includes a container of gas under pressure. A body of ignitable pyrotechnic material is disposed within the container. An igniter assembly is actuatable to ignite the body of pyrotechnic material. As the pyrotechnic material burns, it heats the gas in the container to increase the fluid pressure in the container.

The container defines a generally cylindrical chamber. The chamber is filled with gas under pressure which is introduced into the chamber through a passage. Once the chamber has been filled with gas at a desired pressure, the passage is closed. A conventional pressure switch is associated with the container. The pressure switch monitors the gas pressure in the chamber to alert a passenger of a vehicle if the pressure in the chamber drops below a predetermined pressure.

SUMMARY OF THE INVENTION

The present invention provides a new and improved apparatus for use in inflating an air bag and a new and improved method of assembling the apparatus. The apparatus includes a container which holds a supply of gas under pressure. A plug is disposed in threaded engagement with an internally threaded opening in the container. A seal ring extends around the plug and is disposed in engagement with the container to provide a first seal between the plug and the container. A weld extends around the periphery of the plug and provides a second seal between the plug and the container.

During assembly of the apparatus, a flow of gas is conducted into the container through the internally threaded opening in the container. The plug is then threaded into the opening. As the plug is threaded into the opening, a seal ring on the plug moves into sealing engagement with the container to establish a first hermetic seal between the plug and the container. The plug is then welded to the container to establish a second hermetic seal between the plug and the container. A pressure switch which monitors the gas pressure in the container is mounted in a chamber in the plug.

BRIEF DESCRIPTION OF THE DRAWINGS

The foregoing and other objects and features of the present invention will become more apparent to one skilled in the art to which the present invention relates upon consideration of the following description of the invention with reference to the accompanying drawings, in which.

DESCRIPTION OF PREFERRED EMBODIMENTS OF THE INVENTION

Figure 1:
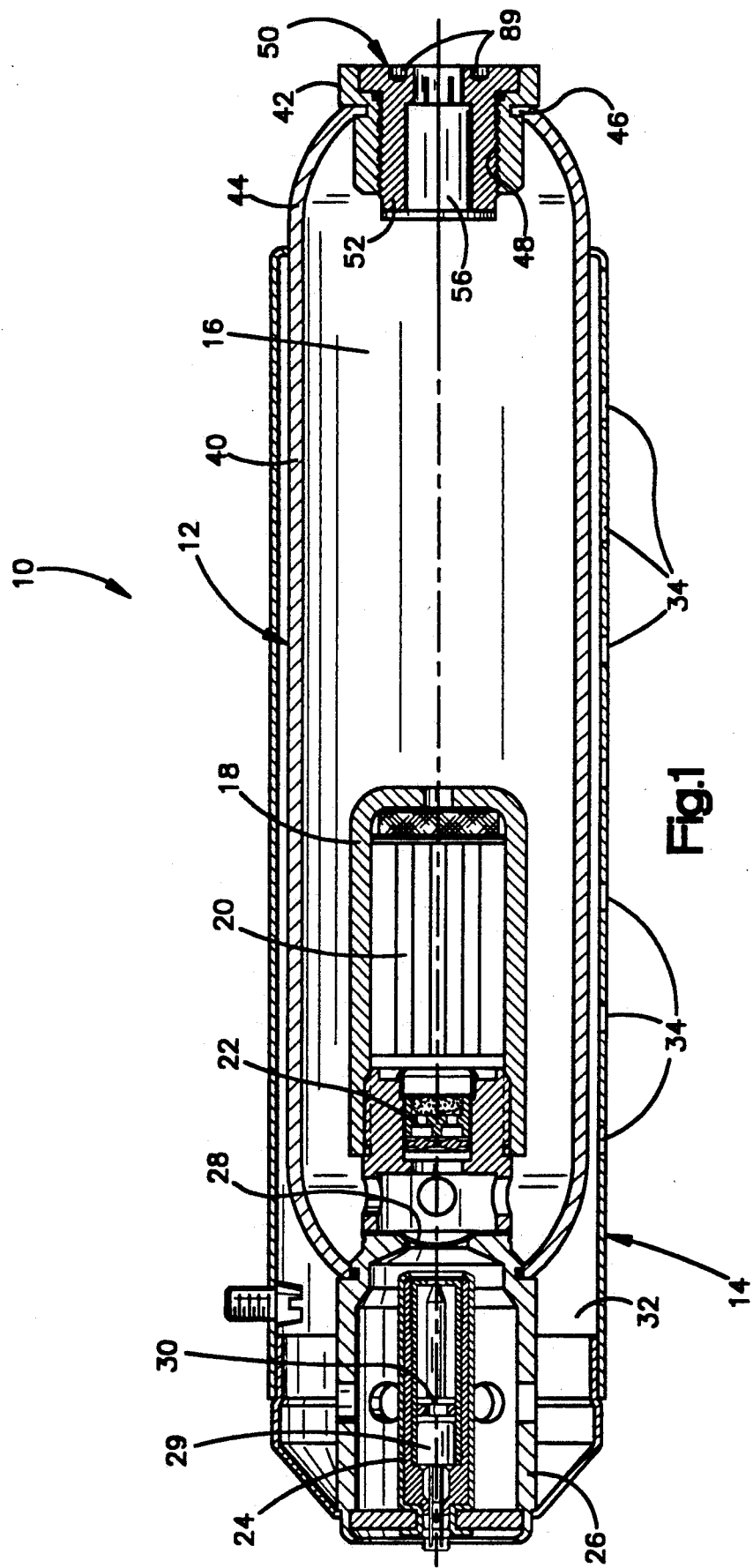
FIG. 1 is a sectional view of an inflator assembly which is constructed and assembled in accordance with the present invention.

An inflator assembly 10 (FIG. 1) is used to inflate a vehicle occupant restraint, such as an air bag. The inflator assembly 10 includes a generally cylindrical container 12 which is partially enclosed by a generally cylindrical diffuser 14. The container 12 includes a chamber 16 which is filled with gas under pressure. A cylindrical metal housing 18, disposed in the chamber 16, holds a body 20 of ignitable pyrotechnic material. A suitable igniter assembly 22 is provided to ignite the body 20 of pyrotechnic material. The igniter assembly 22 may be of any construction including a construction which ignites when it is forcibly struck.

An actuator assembly 24 is mounted outside of the container 12 in a manifold assembly 26. A metal burst disk 28 is provided between the actuator assembly 24 and igniter assembly 22. The actuator assembly 24 includes an ignitable charge of material 29 and a piston 30.

Upon the sensing of sudden vehicle deceleration, the actuator assembly 24 is actuated to release the stored gas from the chamber 16 and to actuate the igniter assembly 22. Specifically, when actuated, the ignitable charge of material 29 is ignited and the piston 30 moves to rupture the burst disk 28 to release the stored gas from the chamber 16. Thereafter, the piston 30 forcibly strikes the igniter assembly 22 to ignite the body 20 of pyrotechnic material. As the body 20 of pyrotechnic material burns, the gas in the chamber 16 is heated and added to by the hot gases produced by the combustion of the body of pyrotechnic material.

Upon rupturing of the burst disk 28, gas flows from the chamber 16 through the manifold assembly 26. The gas flows from the manifold assembly 26 into a chamber 32 formed by the diffuser 14, the outer walls of the manifold assembly, and the outer side surface of the container 12. The diffuser 14 has openings 34 through which gas is directed to an air bag. The manner in which the actuator assembly 24 cooperates with the burst disk 28, igniter assembly 22 and body 20 of ignitable pyrotechnic material to provide a flow of gas to an air bag is not part of the present invention. Moreover, the construction of the inflator assembly 10 and mode of operation of the inflator assembly are merely representative. It is contemplated that the inflator assembly 10 could have a different construction and mode of operation if desired.

Figure 2:
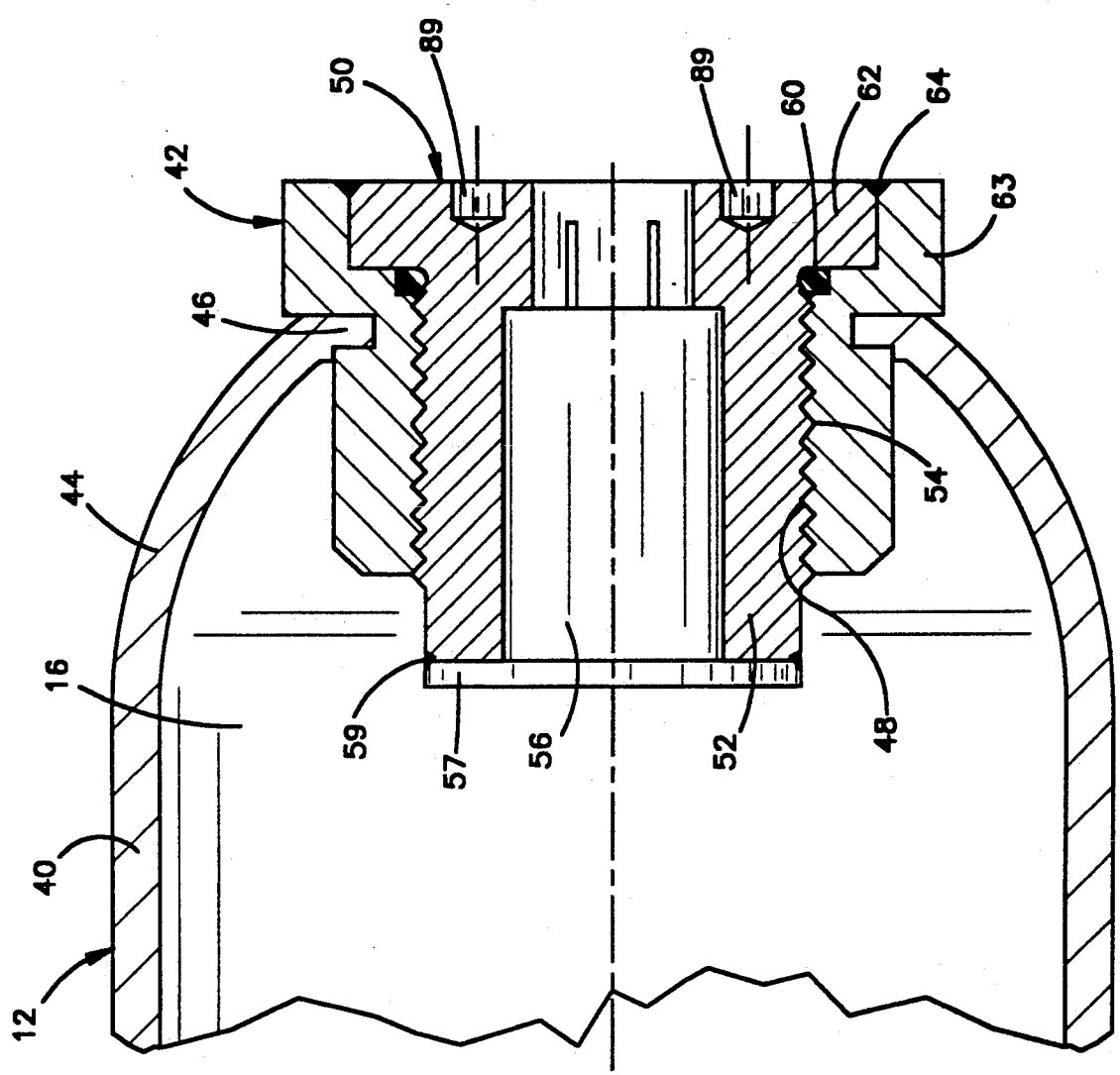
FIG. 2 is an enlarged fragmentary sectional view of a portion of the inflator assembly of FIG. 1.

The container 12 includes a generally cylindrical metal canister 40 and a fitting 42 (FIGS. 1 and 2) located at the right end of the canister 40 as viewed in the drawings. The fitting 42 is connected with the canister 40 by an annular friction weld 46. The fitting 42 has an internally threaded opening 48 in which a plug 50 is threadedly received. The plug 50 has a shank 52 (FIG. 2) with an external thread 54 which engages the internal thread in the opening 48 of the fitting 42.

An annular seal ring 60 (FIG. 2) extends around the shank 52 of the plug 50 at an intersection between the shank and a circular head 62 of the plug 50. The circular head 62 of the plug 50 is circumscribed by an annular rim portion 63 of the fitting 42. The seal ring 60 engages the fitting 42 to provide a hermetic seal between the plug 50 and fitting 42. A second hermetic seal between the plug 50 and fitting 42 is provided by a continuous annular weld 64. The continuous annular weld 64 extends between the head 62 of the plug 50 and the rim portion 63 of the fitting 42. Although the weld 64 could be formed in many different ways, the weld preferably is a tungsten inert gas weld.

As used herein, a hermetic seal is a seal which has an equivalent helium leak rate of less than $1 \times 10^{-5}$ cubic centimeters per second of helium at one atmosphere pressure differential measured at a temperature between $-50°$ C. and $110°$ C. It is contemplated that the hermetic seal provided by the continuous annular weld 64 will last for years and may have a leak rate which is substantially less than $1 \times 10^{-5}$ cubic centimeters per second of helium at one atmosphere pressure differential at a temperature between $-50°$ C. and $110°$ C.

The plug 50 contains a conventional pressure switch 56 which monitors gas pressure in the chamber 16 and provides an output signal to alert a passenger in a vehicle if the pressure in the chamber 16 drops below a predetermined pressure. The pressure switch 56 will not be described in detail since it is conventional. The pressure switch 56 has a metal casing with a radially projecting annular flange 57. A circumferentially extending weld 59 between the flange 57 and the plug 52 provides a hermetic seal blocking gas leakage between the plug 52 and switch 56.

Figure 3:
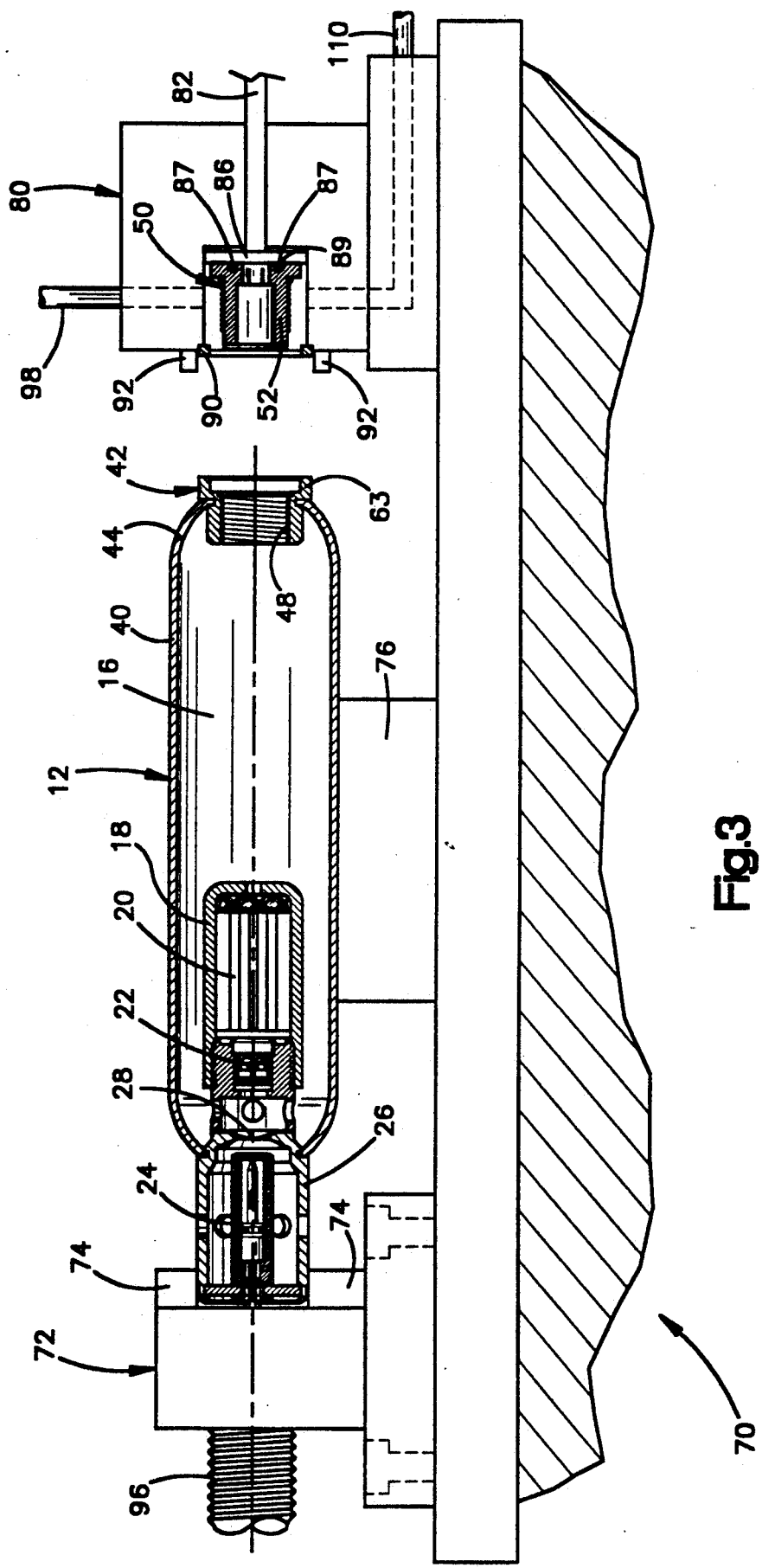
FIGS. 3 and 4 are schematic illustrations depicting a portion of the method of assembling the inflator assembly of FIG. 1.

A fixture assembly 70 for use in filling the container 12 with gas and installing the plug 50 in the fitting 42 is illustrated in FIG. 3. The fixture assembly 70 includes tail portion 72 having jaws 74 to grip the manifold assembly 26 while the canister 40 is disposed on a support member 76. A head portion 80 of the fixture assembly 70 has a cavity 104 (FIG. 4) into which the plug 50 is manually inserted. As the plug 50 is inserted into the cavity 104, the plug is engaged by an end portion 86 of a shaft 82. The end portion 86 of the shaft 82 is magnetized and has a pair of projections 87 that are positioned in openings 89 (FIG. 2) in the plug 50. At one end of the cavity 104, an annular seal 90 (FIG. 3) is provided on the head portion 80 to sealingly engage the fitting 42 on the end portion 44 of the container 12. A pair of jaws 92 are also provided on the head portion 80 to grip the fitting 42 and hold it in position adjacent the seal 90.

Figure 4:
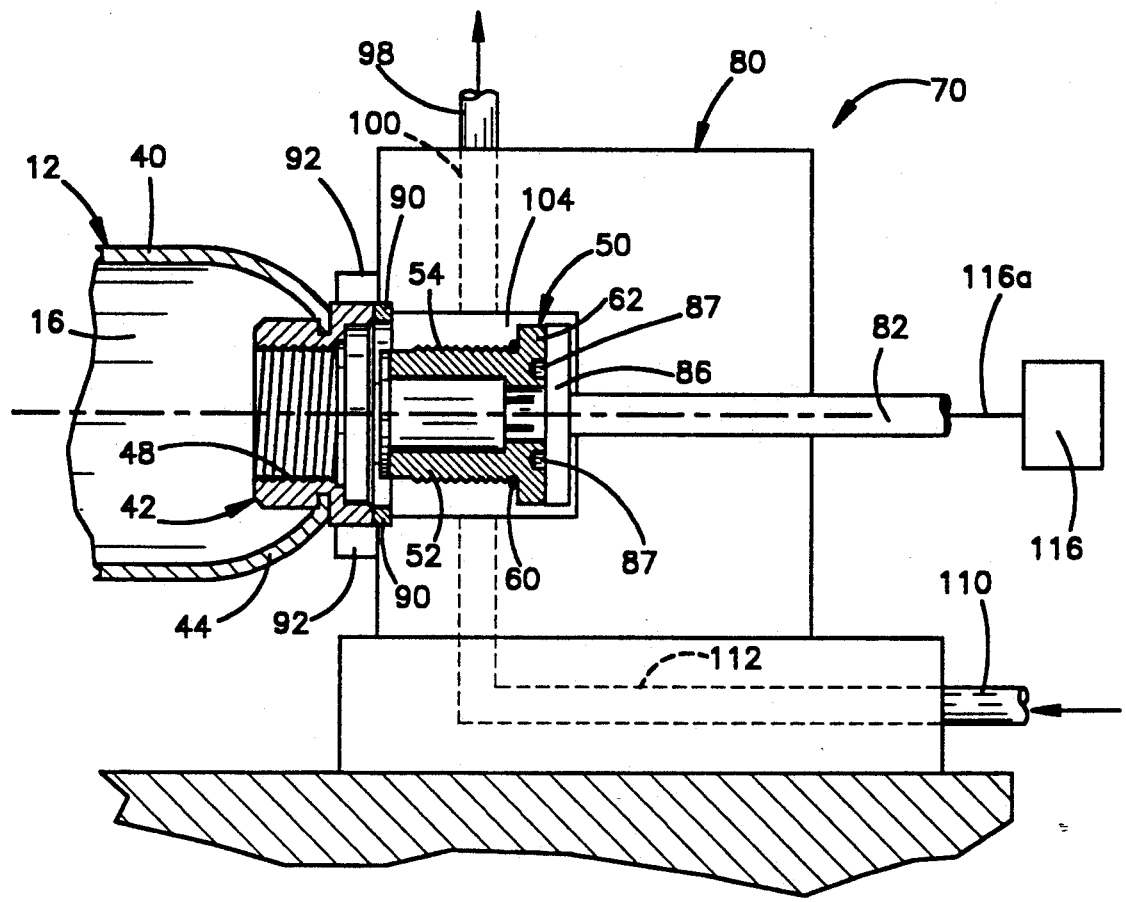

When the container 12 is to be filled with gas and sealed, a lead screw 96 (FIG. 3) moves the jaws 74 and container 12 rightwardly (a viewed in FIG. 3) toward the head portion 80. As the end portion 44 of the container 12 moves toward the head portion 80, the fitting 42 is pressed against the annular seal 90 (FIG. 4). The jaws 92 on the head portion 80 are then closed to grip the fitting 42. This results in the fitting 42 being held in engagement with the head portion 80. The annular seal ring 90 ensures a gas tight seal between the fitting 42 and the head portion 80.

Once the fitting 42 is sealed against the head portion 80, the chamber 16 in the container 12 is evacuated by connecting a conduit 98 with a vacuum pump (not shown). The conduit 98 is connected with a passage 100 formed in the head portion 80. The passage 100 communicates with the cylindrical cavity 104 in which the plug 50 is disposed. The cavity 104, in turn, is connected in fluid communication with the container chamber 16 through the threaded opening 48 in the fitting 42. The chamber 16 is thus evacuated by connecting a source of vacuum with the cavity 104 through the conduit 98.

Once the chamber 16 has been evacuated, a valve (not shown) is closed to block the conduit 98. The chamber 16 is then connected in fluid communication with a source of gas under pressure. A valve (not shown) is actuated to enable gas to be conducted through a conduit 110 and a passage 112 to the cavity 104 in the head portion 80 of the fixture assembly 70. The gas flows from the cavity 104 through the threaded opening 48 in the fitting 42 into the chamber 16 in the container 12. Once the chamber 16 has been filled with gas to the desired pressure, the valve is closed to again block fluid flow through the conduit 110 and passage 112. Although the chamber 16 could be filled with many different types of gas, such as air or nitrogen, the chamber is preferably filled with argon gas at a pressure of approximately 2,500 to 3,500 psi.

Once the chamber 16 has been filled with gas, the plug 50 is screwed into the opening 48 while the gas tight hermetic seal provided by seal 90 is maintained. This is accomplished by moving the shaft 82 toward the left (as viewed in FIG. 4) to move the threaded shank portion 52 of the plug 50 into engagement with the threaded opening 48 in the fitting 42. The shaft 82 is moved to the left by a pneumatic cylinder shown schematically at 116 (FIG. 4). The shaft 82 is then rotated to rotate the plug 50 relative to the fitting 42. As the plug 50 is rotated, it is screwed into the fitting 42 while the pressure in the cylinder 116 is maintained. A suitable bearing arrangement (not shown) is provided between shaft 82 and cylinder 116 to enable shaft 82 to rotate relative to the piston rod 116a (shown schematically) of the cylinder 116 and yet be moved axially by the cylinder 116.

As the plug 50 is screwed into place, the 0-ring 60 moves into sealing engagement with the fitting 42 to seal the chamber 16. Once the plug 50 has been tightly screwed into the fitting 42, the shaft 82 is moved toward the right (as viewed in FIG. 4) to disengage the magnetized end portion 86 of the shaft from the openings 89 in the plug 50. The jaws 92 on the head end portion 80 of the fixture 70 then release the fitting 42. The lead screw 96 (FIG. 3) is then operated to move the container 12, now including the plug 50, from the position shown in FIG. 4 to the position shown in FIG. 3.

The annular seal ring 60 comprises a first hermetic seal which prevents leakage of gas from the chamber 16 through the fitting 42. In order to be certain that gas cannot leak from the chamber 16, the annular weld 64 (FIG. 2) is then formed at the joint between the fitting 42 and the head 62 of the plug 50. In the absence of the weld 64, there is a possibility that, with the passage of time, the seal ring 60 could deteriorate and allow gas to leak from the chamber 16. The weld 64 provides a second hermetic seal to be certain that gas cannot leak from the chamber 16 even after years.

Figure 5:
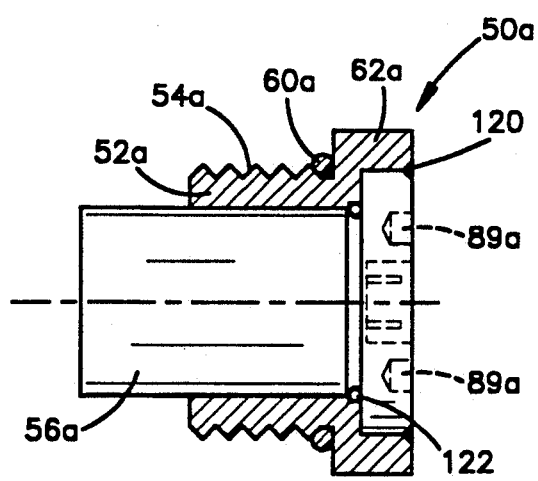
FIG. 5 is a sectional view of another embodiment of a plug for the inflator assembly of FIG. 1.

In the embodiment of the invention illustrated in FIGS. 1-4, a pressure switch 56 is disposed in a chamber formed in the plug 50. The components of the plug of FIG. 5 are similar to the components of the plug of FIGS. 1-4. Therefore, similar numerals are utilized to designate similar components, the suffix letter "a" being added to the numerals of FIG. 5 in order to avoid confusion.

In the embodiment of the plug illustrated in FIG. 5, a pressure switch 56a is disposed in a chamber formed in a plug 50a. The plug 50a has a shank 52a with an external thread 54a. In addition, the plug 50a includes a circular head 62a. An annular seal ring 60a is disposed in abutting engagement with the shank 52a and head 62a of the plug 50a.

In accordance with a feature of this embodiment of the invention, the pressure switch 56a has openings 89a for engagement by the shaft projections 87 of the fixture assembly 70 (FIG. 3). Also, an annular seal ring 122 is provided between the switch assembly 56a and the plug 50a to prevent leakage of fluid therebetween and provide a first hermetic seal therebetween. The seal ring 122 may be of any suitable type. Further, an annular weld 120 secures the switch 56a in position in the plug 50a and also provides a second hermetic seal between the switch 56a and plug 50a.

Figure 6:
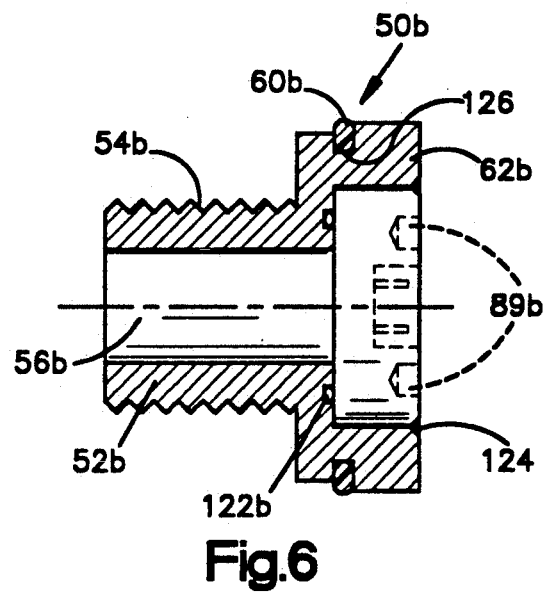
FIG. 6 is a sectional view of still another embodiment of a plug for the inflator assembly of FIG. 1.

A third embodiment of the plug is illustrated in FIG. 6. Since components of the embodiment of the plug illustrated in FIG. 6 are generally similar to components of the plugs illustrated in FIGS. 1-4 and 5, similar numerals will be utilized to designate similar components, the suffix letter "b" being associated with the numerals of FIG. 6 to avoid confusion.

A plug 50b (FIG. 6) includes a shank 52b on which an external thread 54b is formed. An annular seal ring 60b is provided in an annular groove 126 formed in a head 62b of the plug 50b. A seal 122b is provided between a pressure switch 56b and the plug 50b. The pressure switch 56b has openings 89b which receive the projections 87 of the shaft 82.

The seal ring 122b may be of any suitable type. The pressure switch 56b also may be of any suitable type. The seal ring 122b provides a first hermetic seal between the switch 56b and plug 50b. An annular weld 124 provides a second hermetic seal between the switch 56b and the plug 50.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in inflating an air bag, said apparatus comprising:
    container means for holding a supply of gas, said container means having an internally threaded opening;
    a plug in threaded engagement with the internally threaded opening in said container means;
    a seal ring extending around said plug and disposed in sealing engagement with said container means and providing a first seal between said plug and said container means; and
    a weld extending around a peripheral portion of said plug and providing a second seal between said plug and said container means.

2. An apparatus as set forth in claim 1 wherein said weld forms a continuous ring around the periphery of said plug.

3. An apparatus as set forth in claim 1 further including pressure responsive means disposed in said plug for providing an output signal when the gas pressure in said container means is less than a predetermined pressure.

4. An apparatus as set forth in claim 1 wherein said container means includes a canister having a chamber for holding gas and a fitting secured to said canister, said fitting including surface means for defining the internally threaded opening in said container means, said fitting and said plug being interconnected by said weld.

5. An apparatus as set forth in claim 4 wherein said fitting includes a rim portion which circumscribes said plug, said weld extending between said plug and said rim portion of said fitting.

6. An apparatus as set forth in claim 1 wherein said seal ring cooperates with said plug and said container means in such a manner that said first seal is a hermetic seal, said weld cooperating with said plug and said container means in such a manner that said second seal is a hermetic seal.

7. A method of assembling an apparatus for use in inflating an air bag, said method comprising the steps of:
    conducting a flow of gas under pressure into a container through an internally threaded opening in the container;
    screwing a plug into the internally threaded opening in the container;
    locating a seal ring in sealing engagement with the container and plug during said screwing step to establish a first seal between the plug and the container; and
    welding the plug to the container to establish a second seal between the plug and the container.

8. A method as set forth in claim 7 wherein said step of threading the plug into the internally threaded opening includes magnetically gripping the plug.

9. A method as set forth in claim 7 further including the steps of at least partially forming the container by attaching a fitting having an internally threaded opening to a canister, and moving a mechanism for conducting a flow of gas into sealing engagement with the fitting, said step of conducting a flow of gas into the container including conducting a flow of gas from the mechanism into the canister through a seal between the flow conducting fitting and the flow conducting mechanism and through the threaded opening in the fitting.

10. A method as set forth in claim 9 wherein said step of screwing the plug into the internally threaded opening in the container includes moving an externally threaded shank portion of the plug through the seal between the fitting and the flow conducting mechanism and rotating the plug to engage the externally threaded shank portion of the plug with the internally threaded opening in the fitting.

11. A method as set forth in claim 10 wherein said step of welding the plug to the container includes welding a head end portion of the plug to the fitting by forming a continuous circular weld between the plug and fitting.

12. A method as set forth in claim 10 further including the step of moving the flow conducting mechanism out of sealing engagement with the fitting, said step of welding the plug to the container being performed after said step of moving the flow conducting mechanism out of sealing engagement with the fitting, said step of welding the plug to the container includes welding the plug to the fitting.

13. A method as set forth in claim 7 wherein said step of locating a seal ring to establish a first seal includes establishing a hermetic seal between the plug and the container, said step of welding the plug to the container to establish a second seal includes establishing a hermetic seal between the plug and the container.

14. An apparatus for use in inflating an air bag, said apparatus comprising:
    container means holding a supply of gas under pressure, said container means having an internally threaded opening;
    a plug in threaded engagement with the internally threaded opening in said container means;

a seal ring extending around said plug and disposed in sealing engagement with said container means and providing a first seal between said plug and said container means; and a weld extending around a peripheral portion of said plug and providing a second seal between said plug and said container means.

* * * * *